US005556002A

United States Patent [19]
Green

[11] Patent Number: 5,556,002
[45] Date of Patent: Sep. 17, 1996

[54] MEASURED LIQUID DISPENSING SYSTEM

[75] Inventor: Thomas S. Green, Atwater, Ohio

[73] Assignee: ABC TechCorp, Akron, Ohio

[21] Appl. No.: 383,306

[22] Filed: Feb. 3, 1995

[51] Int. Cl.$^6$ ..................................................... B67D 5/08
[52] U.S. Cl. .................. 222/21; 222/61; 222/64
[58] Field of Search ............................... 222/21, 61, 64, 222/394, 434, 450, 444

[56]                  References Cited
              U.S. PATENT DOCUMENTS

| 2,959,055 | 11/1960 | True ............................. | 222/21 X |
| 4,450,981 | 5/1984 | Haig ............................. | 222/61 |
| 4,638,935 | 1/1987 | Buchner et al. ............. | 222/21 |
| 5,012,955 | 5/1991 | Shannon ...................... | 222/61 |
| 5,087,352 | 2/1992 | Cole, Jr. ...................... | 222/61 X |
| 5,145,092 | 9/1992 | Shannon ...................... | 222/61 X |
| 5,148,945 | 9/1992 | Geatz .......................... | 222/61 X |
| 5,294,023 | 3/1994 | Ioannides et al. ........... | 222/61 |
| 5,370,269 | 12/1994 | Bernosky et al. ........... | 222/61 |
| 5,490,611 | 2/1996 | Bernosky et al. ........... | 222/61 X |

FOREIGN PATENT DOCUMENTS 4206477  9/1903  Germany .................................. 222/64

Primary Examiner—Andres Kashnikow
Assistant Examiner—Kenneth Bomberg
Attorney, Agent, or Firm—Renner, Kenner, Greive, Bobak, Taylor & Weber

[57]                     ABSTRACT

A measured dispensing system includes a bulk reservoir containing a bulk quantity of a liquid material and a measurement container interconnected with the bulk reservoir. A pressure sensor is received within the measurement container for sensing a pressure head which develops therein as liquid is caused to enter the measurement container. Additionally, the measurement container has a level sensor therein for sensing the presence and absence of the liquid material in the measurement container at a particular level. A microprocessor controls valves allowing liquid to enter the tank during a filling cycle to determine when a specific quantity of the liquid has been received therein. The microprocessor similarly controls a dispensing valve and monitors a low level sensor to determine when that quantity has been dispensed from the tank.

5 Claims, 1 Drawing Sheet

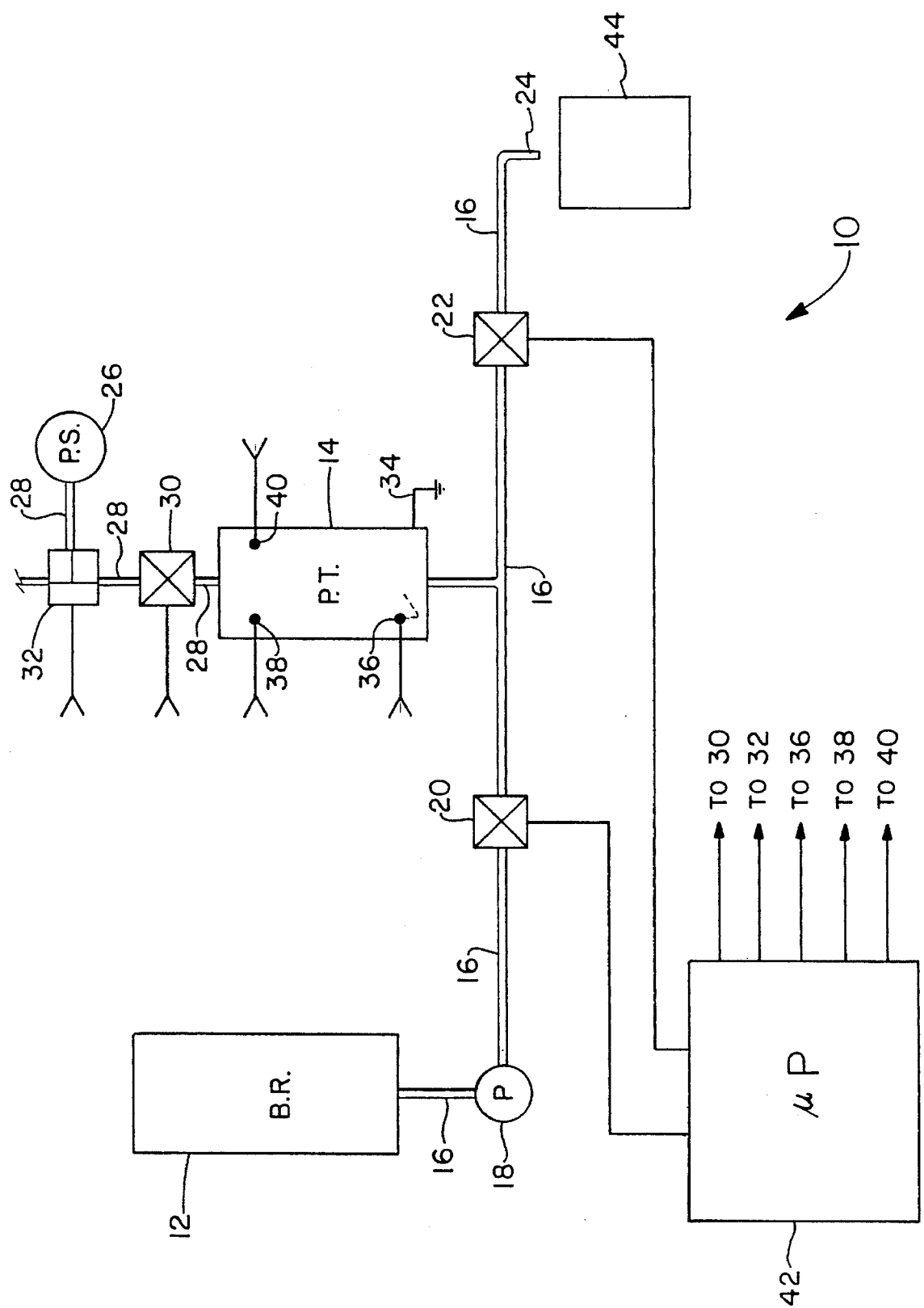

5,556,002

MEASURED LIQUID DISPENSING SYSTEM

TECHNICAL FIELD

The invention herein resides in the art of liquid dispensing devices. More particularly, the invention relates to such a system for accurately dispensing predetermined volumes of liquid. Specifically, the invention relates to a liquid dispensing system which determines volumes or quantities as a function of pressure.

BACKGROUND ART

Many industries require the accurate dispensing of predetermined volumes of liquid in manufacturing, blending, or mixing processes. Previously, such systems have relied upon dispensing through the use of positive displacement pumps, or by timing a dispensing cycle employing a pump having an associated known dispensing rate. Additionally, the simple filling of containers to predetermined measurement marks has also been employed for this purpose. Unfortunately, the prior art has generally been slow and somewhat unreliable in the dispensing operation. Positive displacement pumps are given to wear and misadjustment, as are those pumps which supposedly have a predetermined associated flow rate. Additionally, a system which simply provides for the filling of a container to premarked levels typically requires a settling time or a "hunting" operation of progressively smaller dispensing operations to achieve the desired level without extending past it.

In view of the foregoing, there is a need in the art for a measured liquid dispensing system which is highly reliable in operation and which is given to rapid processing time.

DISCLOSURE OF INVENTION

In light of the foregoing, it is a first aspect of the invention to provide a measured liquid dispensing system which determines volume as a function of pressure in a measurement container.

Another aspect of the invention is to provide a measured liquid dispensing system in which a predetermined quantity of a liquid material is attained by establishing a volume within a pressure tank between a fixed low level mark and a predetermined pressure head.

Still a further aspect of the invention is to provide a measured liquid dispensing system in which volumetric adjustments may be made as a function of temperature.

A further aspect of the invention is to provide a measured liquid dispensing system in which the measurement container also serves as a dispensing container.

Yet a further aspect of the invention is to provide a liquid dispensing system which is accurate and reliable in use, easily constructed from state of the art components, and readily given to implementation with any of numerous liquid dispensing systems.

The foregoing and other aspects of the invention which will become apparent as the detailed description proceeds are achieved by a measured dispensing system, comprising: a bulk reservoir maintaining a bulk quantity of a liquid material; a measurement container interconnected with said bulk reservoir; a pressure source in selective communication with said measurement container; a pressure sensor received by said measurement container for sensing a pressure head therein; a level sensor received by said measurement container for sensing the presence and absence of said liquid material in said measurement container at a particular level; and control means interconnected with said pressure and level sensors for determining the presence of a specific quantity of said liquid material within, and the effective dispensing of said specific quantity of liquid material from, said measurement container.

Other aspects of the invention which will become apparent as the detailed description proceeds are achieved by a method for dispensing a specific quantity of a liquid material, comprising: sealing a pressure tank; passing said liquid material from a bulk supply to said pressure tank; monitoring a pressure head in said pressure tank as said liquid material passes thereinto; terminating said passing of said liquid material into said pressure tank when said pressure head reaches a predetermined level; and dispensing said liquid material from said pressure tank until said liquid material reaches a predetermined level.

DESCRIPTION OF DRAWING

For a complete understanding of the objects, techniques, and structure of the invention reference should be made to the following detailed description and accompanying drawing wherein a system illustrative of the concept of the invention is shown.

BEST MODE FOR CARRYING OUT THE INVENTION

Referring now to the drawing, it can be seen that a measured liquid dispensing system made in accordance with the invention is designated generally by the numeral 10. The system 10 includes a bulk reservoir 12 adapted for receiving and maintaining a bulk quantity of a liquid material to be measured and dispensed. Interconnected with the bulk reservoir 12 is a pressure tank 14 which serves as a measurement container. A conduit system 16 serves to interconnect the bulk reservoir 12 and the pressure tank 14, as shown.

A pump 18 is maintained within the conduit system 16 and between the bulk reservoir 12 and pressure tank 14. Similarly, a filling valve 20 is interposed between the two, while a dispensing valve 22 is maintained within the conduit 16 between the pressure tank or measurement container 14 and the dispensing head 24. Those skilled in the art will readily appreciate that the valves 20, 22 may suitably be provided as solenoid actuated dispensing valves or any other appropriate electro-mechanical valve.

A pressure source 26 of air or appropriate gas is provided in selective communication with the pressure tank 14 through a conduit system 28. Interposed within the conduit system 28 and between the pressure source 26 and pressure tank 14 is a blocking valve 30 which, again, may be a suitable solenoid valve. Also interposed within the conduit system 28 and in communication with the pressure source 26 and pressure tank 14 is an appropriate three-way valve serving as a pressure/vent valve 32.

As shown, the housing or casing of the pressure tank 14 is grounded as at 34. Received within the tank 14 is an appropriate low level sensor 36, positioned at a point within the pressure tank 14 below which one would not expect or desire a liquid level to fall. It will be appreciated that the low level sensor 36 is insulated from the ground of the casing of the pressure tank 14. Also received within the tank 14 is a pressure sensor 38 and a thermal sensor 40. The sensors 38, 40 are shown as being preferably in the head space of the container 14.

The control unit of the measured liquid dispensing system 10 preferably comprises a microprocessor 42 or other appropriate control device which is interconnected and communicates with the pump 18, filling valve 20, dispensing valve 22, blocking valve 30, pressure/vent valve 32, low level sensor 36, pressure sensor 38, and thermal sensor 40. The method of operation and control to dispense predetermined quantities of liquid material from the dispensing head 24 into an appropriate receptacle 44 will become apparent in the following discussion of the operation of the system 10.

The measured liquid dispensing system 10 accurately measures the amount of liquid entering the pressure tank 14, and does so by monitoring compression in the head space above the liquid within the tank. After a specified amount of liquid has entered the tank, the tank may then be pressurized to dispense the measured amount.

The low level sensor 36 establishes a base level of liquid within the tank. The measured quantity is that quantity introduced into the tank 14 and above the bottom of the low level sensor 36. Accordingly, with the low level sensor 36 establishing the base liquid level, there is also established a starting head space in the tank 14 above that level. Using this consistent volume of air in the head space, the incoming liquid to the pressure tank 14 may be measured using the formula $P \times V = P_1 \times V_1$.

The microprocessor 42 controls the system 10 during a fill cycle in the following manner. In the normal quiescent state of the system 10, the pressure tank 14 is vented to atmosphere by appropriate actuation of the blocking valve 30 and the pressure/vent valve 32. At this point in time, the liquid within the tank 14 is at the low level established by the positioning of the low level sensor 36. To commence a measurement cycle, the blocking valve 30 is closed, thus sealing a fixed volume of air in the pressure tank 14 above the liquid level established by the low level sensor 36. The pump 18 is actuated and, at approximately the same time the fill valve 20 is opened. The liquid material is pumped from the bulk reservoir 12 and through the conduit system 16 and into the pressure tank 14. The trapped air in the pressure tank 14 is compressed as the liquid enters the tank, reducing the volume of the pressure head above the liquid and increasing its pressure. The pressure sensor 38 constantly monitors this head pressure, with the information being received and accessed by the microprocessor 42. An appropriate "look-up" table or the like is maintained in memory of the microprocessor 42 to correlate pressure with liquid volume. In other words, the table sets forth in detail the relationship between pressure and volume, allowing for the selection and dispensing of virtually any liquid volume. When the pressure monitored by the pressure sensor 38 indicates that the desired amount of liquid has entered the pressure tank 14, the fill valve 20 is closed and the pump 18 is turned off. At this point in time, a known accurately measured volume of liquid is retained within the pressure tank 14 and above the low level sensor 36.

Dispensing of the measured volume of liquid is also achieved under control of the microprocessor 42. Here, the pressure/vent valve 32 is actuated to interconnect the pressure source 26 with the conduit system 28. Similarly, the blocking valve 30 is opened such that the pressure of the pressure source 26 may be passed into the pressure head of the tank 14. With the tank 14 so pressurized, the dispensing valve 22 is opened, allowing the liquid product to flow from the tank 14, out through the conduit system 16, through the dispensing head 24, and into an appropriate receptacle 44. Under the urging of the pressure introduced by the pressure source 26, the liquid continues to flow until the liquid level in the tank 14 reaches the level of the low level sensor 36. As soon as the liquid drops below the sensor 36, continuity between the probe 36 and ground 34 is broken, the same being sensed by the microprocessor 42, and comprising an indication that the full measure of liquid has been dispensed. Immediately upon sensing the break in continuity between the low level sensor 36 and ground, the dispensing valve 27 is closed, and the valve 32 is actuated to vent the tank 14 to atmosphere, relieving the pressure in the tank 14. At this point in time, the level of the liquid in the tank 14 is at the bottom of the level sensor 36 and is ready for a subsequent measurement and dispensing cycle.

It is also contemplated as a portion of the instant invention that if the liquid from the bulk supply 12 enters the tank 14 at a rapid rate, an increase in temperature may build up from the resulting compression. This temperature rise may be sufficient to impact the measurement being undertaken. Accordingly, the microprocessor 42 communicates with a thermal sensor 40 within the pressure head. The microprocessor 42 may include an adjustment table, or a series of look-up tables which are temperature dependent such that the liquid volume calculation may be appropriately adjusted and/or determined for various temperatures. Additionally, it is also contemplated that the microprocessor 42 will also compensate for the liquid's affinity to absorb air at various compression pressures. Adjustments for volume of liquid may also be made from a look-up table or the like by compensating for such absorption characteristics at the various compression pressures. It is further contemplated that the microprocessor 42 may obviate the need for the thermal sensor 40 by containing information respecting the relationship between temperature and rate of pressure change in the head of the tank 14. Accordingly, by simply monitoring the rate of pressure change, a determination of the thermal effect on the pressure head and resultant liquid volume can be readily determined.

Thus it can be seen that the objects of the invention have been satisfied by the structure and techniques presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A measured liquid dispensing system, comprising:

a bulk reservoir maintaining a bulk quantity of a liquid material;

a measurement container interconnected with said bulk reservoir;

a pressure sensor received by said measurement container for sensing a pressure head therein;

a level sensor received by said measurement container for sensing the presence and absence of said liquid material in said measurement container at a particular level; and control means interconnected with said pressure and level sensors for determining the presence of a specific quantity of said liquid material within, and the effective dispensing of said specific quantity of said liquid material from said measurement container wherein said control means determines a volume of said liquid material within said measurement container as a function of said pressure head.

2. The measured liquid dispensing system according to claim 1, further comprising a thermal sensor within said measurement container and interconnected with said control means, said control means modifying said correlation of said pressure head with said volume of said liquid material as a function of the temperature of said pressure head.

3. The measured liquid dispensing system according to claim 1, wherein said control means modifies said correlation of said pressure head with said volume of said liquid material as a function of a propensity of said liquid material to absorb air under pressure.

4. The measured liquid dispensing system according to claim 1, further comprising a pressure source in selective communication with said measurement container.

5. The measured liquid dispensing system according to claim 4, further comprising a fill valve interposed between said bulk reservoir and said measurement container, a dispensing value interposed between said measurement container and a dispensing head, and a blocking valve interposed between said pressure source and said measurement container, said filling valve, dispensing valve, and blocking valve being connected to and controlled by said control means.

* * * * *